No. 642,458. Patented Jan. 30, 1900.
D. C. KENT.
HAY CARRIER.
(Application filed Oct. 2, 1899.)
(No Model.)
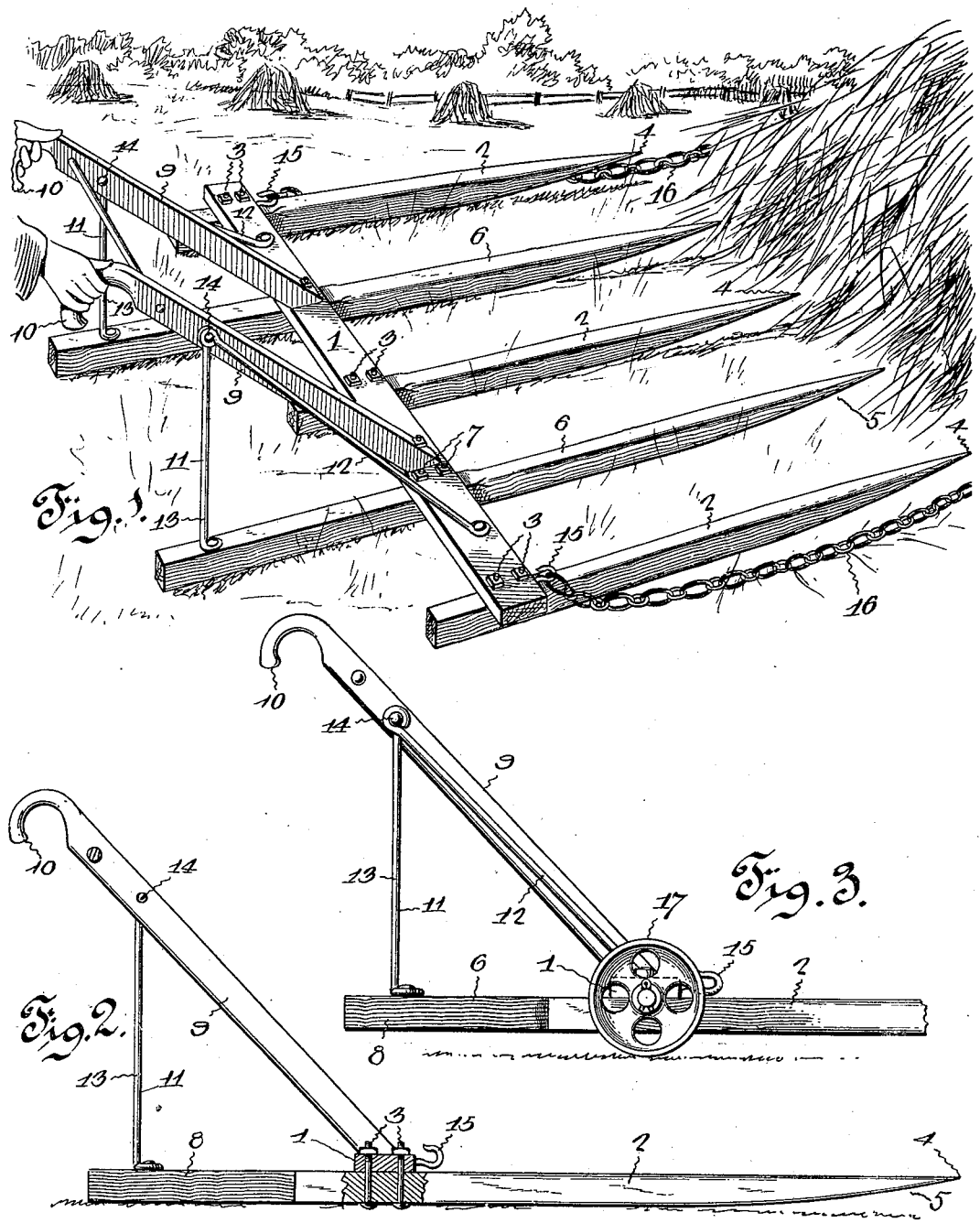

UNITED STATES PATENT OFFICE.

DAVID C. KENT, OF DUBLIN, VIRGINIA.

HAY-CARRIER.

SPECIFICATION forming part of Letters Patent No. 642,458, dated January 30, 1900.

Application filed October 2, 1899. Serial No. 732,431. (No model.)

*To all whom it may concern:*

Be it known that I, DAVID C. KENT, a citizen of the United States, residing at Dublin, in the county of Pulaski and State of Virginia, have invented a new and useful Hay-Carrier, of which the following is a specification.

This invention relates to hay-carriers; and the object of the same is to provide a simple and efficient device of this character adapted to be dragged or moved over a field or other inclosure and by a sliding movement pick up and convey a hay-cock or pile of hay from one point to another to facilitate the operation of loading or storage and controllable by one operator and single draft-animal, and thereby avoid the use of the ordinary forms or complex and cumbersome devices for a similar purpose and with a more expeditious result.

Other objects and advantages will be set out in the subjoined description and the novelty hereinafter claimed, the preferred embodiment of the invention being illustrated in the accompanying drawings, wherein—

Figure 1 is a perspective view of a hay-carrier embodying the invention. Fig. 2 is a central longitudinal vertical section of the same. Fig. 3 is a side elevation of a part of a similar device, showing a slight addition thereto.

Similar numerals of reference are employed to indicate corresponding parts in the several views.

The numeral 1 designates a transversely-disposed main attaching-bar, and to the outer extremities and an intermediate point thereof tines or fingers 2 are secured by bolts 3, which are arranged in pairs to obtain a more rigid connection. The front extremities of the tines or fingers 2 are pointed, as at 4, and have the under sides of the front extremities beveled upwardly and outwardly, as at 5, thereby disposing the points 4 at an elevation above the ground surface when the carrier is in operative position. The rear ends of the tines or fingers 2 are projected for a short distance beyond the rear edge of the bar 1, and for a greater part of their length the said tines have their under edges arranged to bear firmly upon the ground or other surface over which the carrier may be drawn. Located centrally in the spaces between the tines 2 are elongated tines 6, which are in like manner secured to the bar 1 by pairs of bolts 7, and in advance of the said bar the tines 6 are of equal length and shaped precisely as the tines 2. In rear of the bar 1 the said tines 6 are projected to form balancing extensions 8 on opposite sides of the center of the device and serving to maintain the equilibrium of the carrier in its movement over the ground or other surface, and particularly when loaded and having attached thereto a draft-animal.

To the bar 1 are secured the lower ends of handles 9, which have well-known grips 10 at the rear and are held at a fixed angle of inclination by opposite braces 11, secured, respectively, to the bar 1 and the extensions 8, which are positioned under the said handles. The leg 12 of each brace is deflected at an outward angle and secured to the bar 1, and the leg 13 is substantially vertical and is made fast to the adjacent extension. Both legs are connected to a pin or other analogous fastening 14 on the handle. Through the medium of these handles the carrier may be directed in its movements and also tilted downwardly at the front to a slight degree in the operation of loading it. When the load is on the carrier, however, tilting will be prevented by the operator in the event that the load is not well disposed; but under normal conditions and owing to the provisions of the extensions 8 the load will be caused by a proper manipulation to exert the preponderance of its weight near the bar 1, and the said extensions will then serve as rear balancing-runners and prevent the load from throwing up the front ends of the tines.

Adjacent the opposite ends of the bar 1 in the front edge draft-hooks 15 are fastened, to which are adapted to be connected draft-chains 16, which may be also attached to a suitable draft device at their front ends for accommodation of a draft-animal. At times, however, the carrier may be used without a draft-animal, and when handling light loads and by the employment of the hooks 15, whereby the chains 16 may be readily disconnected, a single carrier may be used in both ways. It may be desirable also at times to use means for assisting in the movement or propulsion of the carrier, and, as shown by Fig. 3, wheels or rollers 17 can be journaled near the opposite ends of the bar 1. In this construction the extensions 8 will also serve to prevent backward overthrow of the carrier, and this form of the device will be especially useful in handwork within a barn or storehouse.

Various changes in the form, proportion, and minor details can be resorted to within the scope and without sacrificing any of the advantages of the invention.

Having thus described the invention, what is claimed as new is—

In a device of the character set forth, the combination of a series of horizontal tines of comparatively short length, other horizontal tines located centrally in the space between the former tines and having a decided rear projection beyond the rear terminals of the first-named tines to form balancing projections, a bar extending transversely across the upper portion and rigidly connected to all the tines in advance of their rear terminals, a pair of parallel handle-bars arranged at a downward angle of inclination and having their front ends secured to the said bar and the upper rear terminals projected over the tines having a decided rear projection and connected near their upper rear terminals by a cross-tie rod, vertical braces attached to the outer sides of the handle-bars near the upper rear extremities of the latter and to the top edges of the tines having the decided rear projections and located under the said handle-bars, whereby the carrier may be elevated or depressed at the rear without breaking the connection of the handle-bars with the transverse bar fixed to the tines, and outwardly-extending angularly-disposed braces having their upper rear extremities attached to the handle-bars at the same points that the vertical braces are connected thereto, the lower ends of the said outwardly-extending braces being applied to the top surface of the bar connecting the tines whereby the handles may be used to swing the carrier to either side without weakening the securement of the said handle-bars.

In testimony that I claim the foregoing as my own I have hereto affixed my signature in the presence of two witnesses.

DAVID C. KENT.

Witnesses:
W. H. TROLINGER,
WM. M. KING.